United States Patent
Zhang et al.

(10) Patent No.: US 11,733,771 B2
(45) Date of Patent: Aug. 22, 2023

(54) HIGH-PRECISION ANTI-INTERFERENCE VR SYSTEM AND OPERATION METHOD

(71) Applicant: QINGDAO PICO TECHNOLOGY CO., LTD., Shandong (CN)

(72) Inventors: Xiuzhi Zhang, Shandong (CN); Hongwei Zhou, Shandong (CN); Guanghui Liu, Shandong (CN); Hengjiang Guo, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/885,836

(22) Filed: Aug. 11, 2022

(65) Prior Publication Data
US 2022/0382365 A1  Dec. 1, 2022

Related U.S. Application Data

(63) Continuation of application No. PCT/CN2021/118542, filed on Sep. 15, 2021.

(30) Foreign Application Priority Data
Sep. 16, 2020  (CN) .......................... 202010973572.3

(51) Int. Cl.
G06F 3/01  (2006.01)
G01S 1/70  (2006.01)
H04B 1/715  (2011.01)

(52) U.S. Cl.
CPC ............ G06F 3/011 (2013.01); G01S 1/7038 (2019.08); H04B 1/715 (2013.01)

(58) Field of Classification Search
CPC ........ G06F 3/011; G01S 1/7038; H04B 1/715
(Continued)

(56) References Cited

U.S. PATENT DOCUMENTS 9,942,681 B2 * 4/2018 Dufosse ............... H04R 1/1083
2011/0156926 A1 * 6/2011 Chen ....................... H05B 45/10
  315/158
(Continued)

FOREIGN PATENT DOCUMENTS

CN  110530356 A    12/2019
CN  111174683 A  * 5/2020  ........... G01B 11/002
(Continued)

OTHER PUBLICATIONS

English Translation of Chinese Publication CN 111174683 (Year: 2020).*
(Continued)

*Primary Examiner* — Loi H Tran

(57) ABSTRACT

Provided is a high-precision anti-interference VR system, including a data selection module, a headset, and a handle matched with the headset, the data selection module selects and invokes an optical tracking module group and an electromagnetic tracking module group according to an optical FOV range; the optical tracking module group includes an optical display module and an optical tracking module, the optical display module emits a physical signal by adjusting on-off and brightness thereof; the optical tracking module obtains the physical signal emitted by the optical display module, and converts the physical signal into tracking information of the handle; the electromagnetic tracking module group includes an electromagnetic emission module and an electromagnetic receiving module, the electromagnetic emission module generates an electromagnetic signal through a driving circuit, and transmits the electromagnetic signal; and the electromagnetic receiving module receives the electromagnetic signal to complete electromagnetic tracking.

16 Claims, 2 Drawing Sheets

(58) Field of Classification Search
USPC .......................................................... 348/164
See application file for complete search history.

(56) References Cited

U.S. PATENT DOCUMENTS

| | | | |
|---|---|---|---|
| 2019/0110039 A1* | 4/2019 | Linde | H04N 5/232 |
| 2019/0113966 A1 | 4/2019 | Connellan et al. | |
| 2019/0389365 A1* | 12/2019 | Schneider | F21S 41/60 |
| 2020/0319844 A1* | 10/2020 | Janes | G06F 3/165 |
| 2021/0357032 A1* | 11/2021 | Ghosh | G06F 3/014 |
| 2022/0148318 A1* | 5/2022 | Xia | G06T 7/60 |

FOREIGN PATENT DOCUMENTS

| | | | | |
|---|---|---|---|---|
| CN | 111174683 A | | 5/2020 | |
| CN | 105572482 B | * | 6/2020 | ........... G01R 29/085 |
| CN | 112181138 A | | 1/2021 | |
| CN | 112214106 A | | 1/2021 | |

OTHER PUBLICATIONS

English Translation of Chinese Publication CN 105572482 (Year: 2020).*

* cited by examiner

HIGH-PRECISION ANTI-INTERFERENCE VR SYSTEM AND OPERATION METHOD

CROSS-REFERENCE TO RELATED APPLICATION

This disclosure is a continuation of International Patent Application No. PCT/CN2021/118542, filed Sep. 15, 2021, which claims priority to Chinese Patent Application No. CN202010973572.3, filed on Sep. 16, 2020 and entitled "HIGH-PRECISION ANTI-INTERFERENCE VR SYSTEM AND OPERATION METHOD", each of which is incorporated herein by reference in its entirety.

TECHNICAL FIELD

The present disclosure relates to the field of computer vision, and more specifically, to a VR device management method and system.

BACKGROUND

At present, in the field of VR vision, most of the existing All-in-one VR 6DOF designs of the all-in-one machine support 6DOF head tracking. A relative location relationship between a headset and a handle is determined by using optical, ultrasonic, electromagnetic and other solutions. And on the basis of the current headset, a location of the handle is converted into a world coordinate system of the handle through the mapping of the relative relationship. In the solutions described above, the optical tracking has an FOV limitation, the ultrasonic tracking has interference problems such as FOV limitation, external reflection and block, and the electromagnetic tracking also has the problem of external magnetic field interference. There is no solution that can effectively resolve the foregoing problems in existing product applications.

Therefore, a high-precision anti-interference VR system and operation method is urgently needed to resolve problems that an optical FOV is relatively small and an electromagnetic handle cannot be used when magnetic field intensity is relatively large.

SUMMARY

In view of the foregoing problems, the present disclosure provides a high-precision anti-interference VR system to resolve problems in the existing All-in-one VR 6DOF designs of the all-in-one machine, for example, the optical tracking has an FOV limitation, the ultrasonic tracking has interference problems such as FOV limitation, external reflection and block, and the electromagnetic tracking also has the problem of external magnetic field interference, resulting in poor anti-interference ability and low accuracy of the VR system.

An embodiment of the present disclosure provides a high-precision anti-interference VR system, including a data selection module, a headset, and a handle matched with the headset, wherein, the data selection module is configured to select and invoke an optical tracking module group and an electromagnetic tracking module group according to an optical FOV range;

the optical tracking module group includes an optical display module arranged in the handle and an optical tracking module arranged on the headset, where, the optical display module is configured to emit a physical signal by adjusting on-off and brightness thereof;

the optical tracking module is configured to: obtain the physical signal emitted by the optical display module, and convert the physical signal into tracking information of the handle;

the electromagnetic tracking module group includes an electromagnetic emission module arranged on the handle and an electromagnetic receiving module arranged on the headset, where, the electromagnetic emission module is configured to: generate an electromagnetic signal through a driving circuit and transmit the electromagnetic signal; and the electromagnetic receiving module is configured to receive the electromagnetic signal to complete electromagnetic tracking.

In an embodiment, the optical tracking module includes a head-mounted camera and a parameter adjustment module, wherein, the head-mounted camera is configured to track the handle and an external environment;

the parameter adjustment module is configured to: adjust an exposure parameter of the head-mounted camera, align an exposure center point of each head-mounted camera, and preset a tracking rule of the head-mounted camera; and the tracking rule includes: an odd-numbered frame of an image obtained by the head-mounted camera is used to track the external environment; and an even-numbered frame of the image obtained by the head-mounted camera is used to track the handle.

In an embodiment, both the headset and the handle are provided with an IMU sensor module configured to obtain tracking information and location prediction information of the headset and the handle, and the IMU sensor module includes at least a gravity acceleration sensor and a gyroscope; and the IMU sensor module in the headset is further configured to assist in adjusting the exposure parameter; the IMU sensor module in the handle is further configured to: select the on-off of the optical display module according to predicted tracking information of the handle, and adjust the brightness of the optical display module.

In an embodiment, the system further includes a wireless transmission module group, the wireless transmission module group includes a headset wireless module arranged on the headset and a handle wireless module arranged on the handle, the handle wireless module matches the headset wireless module and is configured to cooperate with the headset wireless module to transmit a wireless signal.

In an embodiment, the wireless signal includes key information of the handle, IMU sensing information of the handle obtained by the IMU sensor module, synchronization information between a time system of the headset and a time system of the handle, and display information of the optical display module.

In an embodiment, the electromagnetic receiving module is further configured to: perform signal amplification and A/D conversion on the electromagnetic signal, and complete data conversion from an I2S to an SPI or a USB through an FPGA chip to form a tracking digital signal, and transmit the tracking digital signal to a processor.

In an embodiment, the processor is configured to: read emission calibration information of the electromagnetic emission module, obtain receiving calibration information of the electromagnetic receiving module to initialize an electromagnetic tracking system, and obtain the tracking digital signal to complete the electromagnetic tracking.

In an embodiment, the system further includes a time stamp implementation module, the time stamp implementation module is configured to calculate a latency time in a process of tracking the handle to obtain a correct time stamp when a tracking behavior occurs.

In an embodiment, when the optical FOV is within a preset threshold range, optical tracking is automatically selected; and when the optical FOV is outside the preset threshold range, electromagnetic tracking is automatically selected.

An embodiment of the present disclosure further provides a high-precision anti-interference VR operation method based on the foregoing high-precision anti-interference VR system, including:

obtaining an optical FOV range of the VR system in real time; and selecting and invoking a tracking mode according to the optical FOV range, where the tracking mode includes an optical tracking mode and an electromagnetic tracking mode; where if the optical tracking mode is selected, a physical signal of an optical display module in a handle is obtained, the physical information is converted into a digital signal, and the digital signal is transmitted to a processor to complete optical tracking; and if the electromagnetic tracking mode is selected, an electromagnetic signal emitted by the handle is obtained, the electromagnetic signal is digitally processed to form a digital signal, and the digital signal is sent to the processor to complete electromagnetic tracking.

It may be seen from the foregoing technical solutions that in the high-precision anti-interference VR system and method provided in the embodiments of the present disclosure, the optical tracking module group and the electromagnetic tracking module group are selected and invoked according to the optical FOV range; if the optical tracking module group is selected, the optical display module emits the physical signal by adjusting the on-off and the brightness thereof; the optical tracking module obtains the physical signal emitted by the optical display module, and converts the physical signal into the tracking information of the handle; if the electromagnetic tracking module group is selected, the electromagnetic emission module generates the electromagnetic signal through a driving circuit, and transmits the electromagnetic signal, the electromagnetic receiving module receives the electromagnetic signal to complete electromagnetic tracking. The method is the same. First, the optical FOV range of the VR system is obtained in real time, and then the optical tracking mode and the electromagnetic tracking mode are selected and invoked according to the optical FOV range. Thus, based on combination of the optical solution and the electromagnetic solution, both the problem of the relatively small optical FOV and the problem that the electromagnetic handle cannot be used when the magnetic field intensity is relatively large are resolved. Through the combination of the two technologies, a high-precision low-latency optical tracking solution may be used within the optical FOV range, and the electromagnetic solution supporting 360-degree tracking may be used outside the optical FOV range to greatly improve anti-interference and environmental adaptability of a VR product.

BRIEF DESCRIPTION OF THE DRAWINGS

By referring to the contents of the specification below combined with the accompanying drawings, and with a more comprehensive understanding of the present disclosure, other objectives and results of the present disclosure will become clearer and easier to understand. In the drawings.

DETAILED DESCRIPTION OF THE EMBODIMENTS

Most of the existing All-in-one VR 6DOF designs of the all-in-one machine support 6DOF head tracking. On the basis of the current headset, a location of the handle is converted into a world coordinate system of the handle through the mapping of the relative relationship, so as to complete the tracking. In the solutions described above, the optical tracking has an FOV limitation, the ultrasonic tracking has interference problems such as FOV limitation, external reflection and block, and the electromagnetic tracking also has the problem of external magnetic field interference, resulting in poor anti-interference ability and low accuracy problems of the VR product.

In view of the foregoing problems, the embodiments of the present disclosure provide a high-precision anti-interference VR system. Specific embodiments of the present disclosure will be described in detail below with reference to the accompanying drawings.

Figure 1:
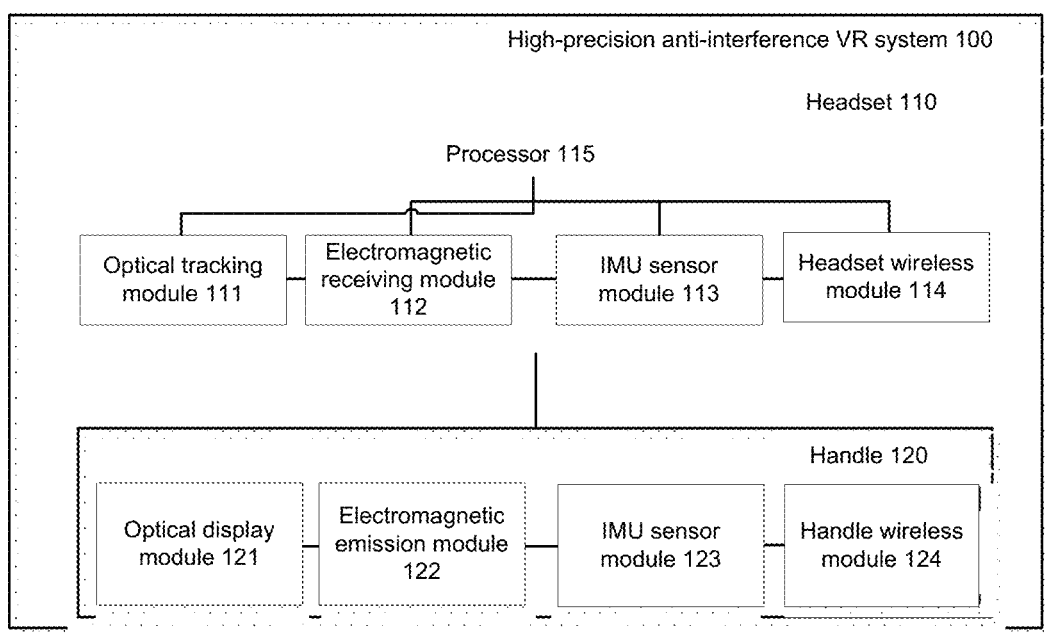
FIG. 1 is a system frame diagram of a high-precision anti-interference VR system according to an embodiment of the present disclosure.
Figure 2:
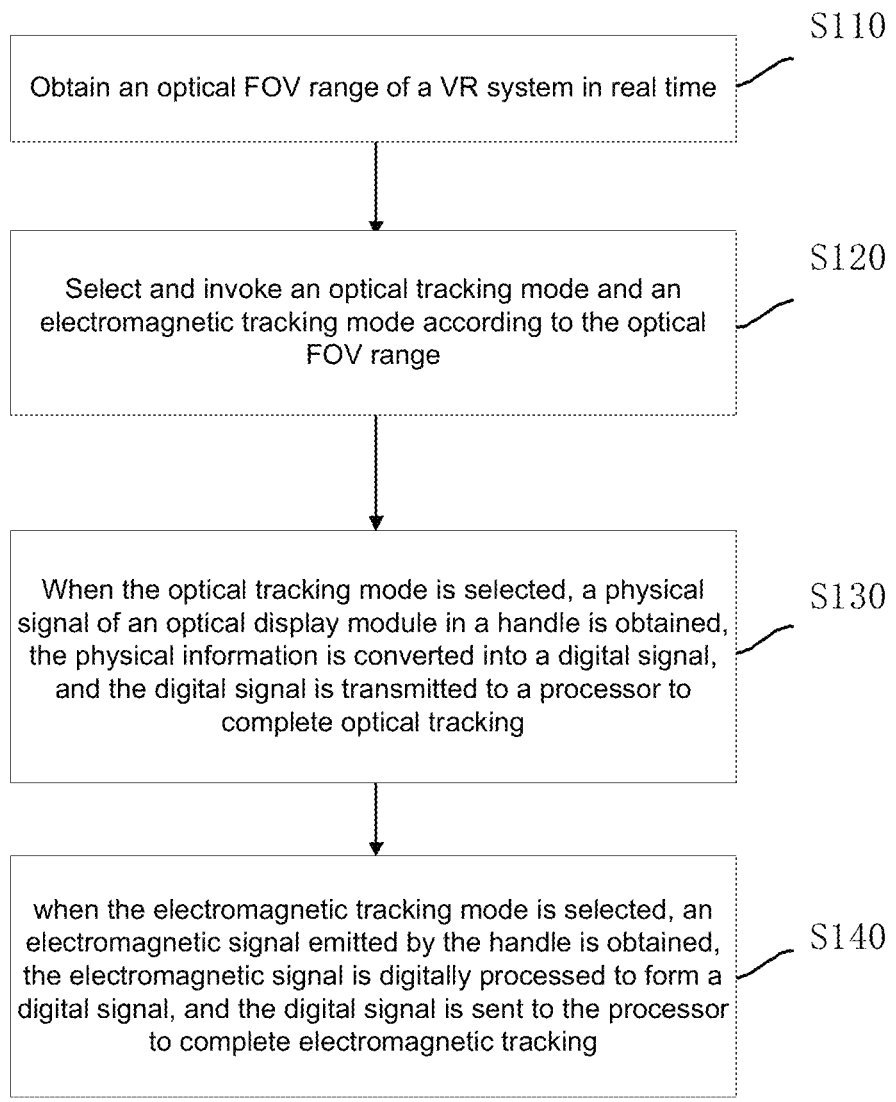
FIG. 2 is a method flowchart of a high-precision anti-interference VR operation method according to an embodiment of the present disclosure.

In order to illustrate the high-precision anti-interference VR system provided in the embodiments of the present disclosure, FIG. 1 exemplifies the high-precision anti-interference VR system of the embodiments of the present disclosure; and FIG. 2 exemplifies the high-precision anti-interference VR operation method of the embodiments of the present disclosure.

The description of the following examples of the embodiments is merely illustrative in fact, and by no means serves as any limitation to the present disclosure and application or use thereof. The technology and the device known to those of ordinary skill in the relevant fields may not be discussed in detail, but if appropriate, the technology and the device should be regarded as part of the specification.

As shown in FIG. 1, the high-precision anti-interference VR system 100 provided in the embodiments of the present disclosure includes a data selection module (not shown in the figure), a headset 110, and a handle 120 matched with the headset 110. In this embodiment, one headset 110 is matched with two handles 120. The data selection module is a virtual module, and is configured to select and invoke an optical tracking module group and an electromagnetic tracking module group according to an optical FOV range. When the optical FOV is within a preset threshold range, optical tracking is automatically selected, and when the optical FOV is outside the preset threshold range, electromagnetic tracking is automatically selected. The range is preset and is not specifically restricted herein. In other words, the optical tracking module group is invoked within a preset optical FOV threshold range with a high-precision low-latency optical tracking solution, and the electromagnetic tracking module group is invoked outside the preset optical FOV threshold range with an electromagnetic solution supporting 360-degree tracking, thus improving anti-interference and environmental adaptability of a VR product.

In the embodiment shown in FIG. 1, the optical tracking module group includes an optical display module 121 arranged in the handle 120 and an optical tracking module 111 arranged on the headset 110, where the optical display module 121 is configured to emit a physical signal by adjusting the on-off and the brightness thereof; the optical tracking module 111 is configured to obtain the physical signal emitted by the optical display module 121, and convert the physical signal into tracking information of the handle. In this embodiment, the optical tracking module 111 includes a head-mounted camera, and the optical display module 121 includes an LED light that is arranged on a surface of the handle 120 and can be captured by the head-mounted camera, such that the headset may obtain the tracking information of the handle by scanning the LED light. Specifically, the optical tracking module 111 includes not only the head-mounted camera, but also a parameter adjustment module (not shown in the figure). The head-mounted camera is configured to track the handle 120 and external environment, and the parameter adjustment module is configured to: adjust an exposure parameter of the head-mounted camera, align an exposure center point of each head-mounted camera, and preset a tracking rule of the head-mounted camera; and the tracking rule is preset and is not specifically restricted herein. In this embodiment, the tracking rule is that an odd-numbered frame of an image obtained by the head-mounted camera is used to track the external environment, and an even-numbered frame of the image obtained by the head-mounted camera is used to track the handle, so as to accurately track the handle in combination with the external environment and improve accuracy and immersion of the entire VR system.

In the embodiment shown in FIG. 1, both the headset 110 and the handle 120 are provided with an IMU sensor module configured to obtain tracking information and location prediction information of the headset 110 and the handle 120. Specifically, the headset 110 includes an IMU sensor module 113, the handle 120 includes an IMU sensor 123, the IMU sensor module 113 and the IMU sensor 123 includes at least a gravity acceleration sensor and a gyroscope. The IMU sensor module 113 is configured to obtain tracking information and location prediction information of the headset 110, and is further configured to assist in adjusting the exposure parameter of the head-mounted camera arranged on the headset 110; and the IMU sensor module 123 is configured to obtain tracking information and location prediction information of the handle 120, and is further configured to: select the on-off of the optical display module 121 according to predicted tracking information of the handle, and adjust the brightness of the optical display module, namely, adjust a quantity of LED lights and brightness of the LED lights in this embodiment.

In the embodiment shown in FIG. 1, the electromagnetic tracking module includes an electromagnetic emission module 122 arranged on the handle 120 and an electromagnetic receiving module 112 arranged on the headset 110, where the electromagnetic emission module 122 is configured to generate an electromagnetic signal through a driving circuit, and transmit the electromagnetic signal, the electromagnetic receiving module 112 is configured to receive the electromagnetic signal to complete electromagnetic tracking, and the electromagnetic receiving module 112 is further configured to: perform signal amplification and A/D conversion on the electromagnetic signal, and complete data conversion from an I2S to an SPI or a USB through an FPGA chip to form a tracking digital signal, and transmit the tracking digital signal to a processor. In other words, the handle 120 transmits the location information thereof to the headset 110 through the electromagnetic signal, and the headset 110 processes the received electromagnetic signal, and then transmits the processed signal to a processor 115 in the headset 110.

In the embodiment shown in FIG. 2, the processor 115 participates in both an optical tracking process and an electromagnetic tracking process. In the optical tracking process, when the optical tracking module 111 reads the physical signal emitted by the optical display module 121, the physical signal is converted into a digital signal, and the digital signal is transmitted to a processor to obtain the tracking information of the handle, and the processor gathers various information such as the IMU sensing information of the handle during the optical tracking process, so as to complete visual and auditory experience of a user in the entire process; and in the electromagnetic tracking process, the processor 115 is configured to: not only process various information of the handle, but also read emission calibration information of the electromagnetic emission module, and obtain receiving calibration information of the electromagnetic receiving module to initialize an electromagnetic tracking system, and obtain the foregoing tracking digital signal to complete electromagnetic tracking. In addition, the processor sets different handles and different transmitting powers according to a distance between the handle 120 and the headset 110. This embodiment includes two handles 120, that is, different transmitting powers of the two handles are set according to the distance between the two handles 120 and the headset 110. Therefore, on the one hand, power consumption of the handle can be saved, and on the other hand, a transmitting power of the handle that is closer to the headset can be reduced, and influence of the closer handle on the signal of the farther handle is also reduced, which is beneficial to improve accuracy of the entire system.

The embodiment shown in FIG. 1, the high-precision anti-interference VR system 100 provided in the embodiments of the present disclosure further includes a wireless transmission module group, the wireless transmission module group includes a headset wireless module 114 arranged on the headset 110 and a handle wireless module 124 arranged on the handle 120, the handle wireless module 124 matches the headset wireless module 114 and is configured to cooperate with the headset wireless module 114 to transmit a wireless signal. The wireless signal includes at least key information of the handle 120, IMU sensing information of the handle 120 obtained by the IMU sensor module 123, synchronization information between a time system of the headset 110 and a time system of the handle 120, and display information of the optical display module 121, namely, physical key information of the handle 120, IMU sensing information, time information, and the like may all be transmitted to the headset 110 through wireless transmission.

In addition, the high-precision anti-interference VR system 100 provided in the embodiments of the present disclosure further includes a time stamp implementation module (not shown in the figure). The time stamp implementation module is a virtual module arranged in both the headset 110 and the handle 120, and is configured to calculate a latency time in a handle tracking process to obtain a correct time stamp when a tracking behavior occurs. This behavior may be all behaviors that occur during operation of the entire VR system. For example, no matter whether the optical tracking module or the electromagnetic tracking module is selected and invoked, the headset 110 may obtain an HMD image. There is a latency in the process of obtaining the HMD image, and a time stamp for the headset 110 to obtain the HMD image is a time stamp of obtaining the interrupt minus the latency time. Specifically, the time stamp for the headset to obtain the HMD image is usually added based on a time of the exposure center point. Even if exposure parameters of a plurality of cameras on the headset 110 are different, each obtained HMD image has same time stamp data. Taking the IMU sensing information as an example, the time stamp of the IMU sensor module in the headset is added based on data interrupt. Since there is a certain latency (IMU Latency) between physical occurrence of the IMU sensor module and interrupt generation (the latency IMU Latency is related to an IMU configuration filter parameter), after adding a time stamp to the interrupt, accurate time stamp data may be obtained by subtracting the latency (IMU Latency). The time stamp for the headset 110 to receive the electromagnetic signal is added based on SPI interrupt. After the headset receives the electromagnetic signal, the SPI interrupt is triggered. The processor 115 adds the time stamp after receiving the interrupt. Due to electromagnetic signal transmission, signal amplification, A/D conversion, and there is a certain latency (EM latency) in caching some data, then the time stamp of obtaining the HMD image is accurate time stamp data obtained by subtracting EM latency from the time stamp added after receiving the interrupt. In the same way, the handle 120 also needs a time stamp. After the time system of the headset 110 is synchronized with the time system of the handle, the time stamp data is first added in interrupt, and then the accurate time stamp data is obtained by subtracting the latency time from the added time stamp data. Taking the IMU sensor module 123 as an example, the time stamp of the IMU sensing information is also required for a handle end. After the time system of the headset is synchronized with the time system of the handle, the time stamp data is added when the IMU sensor module is interrupted, and an accurate time stamp of the IMU sensing information may be obtained by subtracting the latency of the IMU sensor module.

It may be seen from the foregoing implementation that the high-precision anti-interference VR system provided in the embodiments of the present disclosure can select a tracking mode according to the optical FOV range. No matter which tracking mode is selected, the wireless transmission module and other functional modules may continue as usual. If the optical tracking mode is selected, the optical tracking module group is invoked to obtain the tracking information of the handle by using the head-mounted camera to capture the LED light, the tracking process of the handle is obtained based on the IMU sensing information of the handle, and the tracking information of the handle is predicted. If the electromagnetic tracking mode is selected, the electromagnetic tracking module group is invoked, such that the tracking information of the handle is transmitted to the headset by transmitting the electromagnetic signal, the electromagnetic signal is processed, then the tracking process of the handle is obtained based on the IMU sensing information of the handle, and the tracking information of the handle is predicted. Thus, both the problem of the relatively small optical FOV and the problem that the electromagnetic handle cannot be used when the magnetic field intensity is relatively large are resolved. Through the combination of the two technologies, a high-precision low-latency optical tracking solution may be used within the optical FOV range, and the electromagnetic solution supporting 360-degree tracking may be used outside the optical FOV range to greatly improve anti-interference and environmental adaptability of a VR product, and improve immersion of the user in the process of use.

Corresponding to the foregoing high-precision anti-interference VR system, the embodiments of the present disclosure also provide a high-precision anti-interference VR operation method. FIG. 2 is a method flowchart of a high-precision anti-interference VR operation method according to an embodiment of the present disclosure.

As shown in FIG. 2, the embodiments of the present disclosure provide a high-precision anti-interference VR operation method based on the foregoing high-precision anti-interference VR system, and the method may include the following steps:

step S110, obtaining an optical FOV range of the VR system in real time;

step S120, selecting and invoking an optical tracking mode and an electromagnetic tracking mode according to the optical FOV range;

step S130, if the optical tracking mode is selected, a physical signal of an optical display module in a handle is obtained, the physical information is converted into a digital signal, and the digital signal is transmitted to a processor to complete optical tracking; and step S140, if the electromagnetic tracking mode is selected, an electromagnetic signal emitted by the handle is obtained, the electromagnetic signal is digitally processed to form a digital signal, and the digital signal is sent to the processor to complete electromagnetic tracking.

It may be seen from the foregoing implementation that in the high-precision anti-interference VR operation method provided in the present disclosure, first, the optical FOV range of the VR system is obtained in real time, and then the optical tracking mode and the electromagnetic tracking mode are selected and invoked according to the optical FOV range. If the optical tracking mode is selected, the physical signal of the optical display module in a handle is obtained, the physical information is converted into the digital signal, and the digital signal is transmitted to the processor to complete optical tracking, and if the electromagnetic tracking mode is selected, the electromagnetic signal emitted by the handle is obtained, the electromagnetic signal is digitally processed to form the digital signal, and the digital signal is sent to the processor to complete electromagnetic tracking. Thus, both the problem of the relatively small optical FOV and the problem that the electromagnetic handle cannot be used when the magnetic field intensity is relatively large are resolved. Through the combination of the two technologies, a high-precision low-latency optical tracking solution may be used within the optical FOV range, and the electromagnetic solution supporting 360-degree tracking may be used outside the optical FOV range to greatly improve anti-interference and environmental adaptability of a VR product, and improve immersion of the user in the process of use.

The embodiments of the present disclosure further provide a computer-readable storage medium, where a computer program is stored in the computer-readable storage medium, and the computer program is configured to implement steps in any one of the foregoing method embodiments during running.

The embodiments of the present disclosure further provide an electronic apparatus including a memory and a processor, a computer program is stored in the memory, and the processor is configured to run the computer program to implement steps in any one of the foregoing method embodiments.

As described above, the VR device management method and system proposed in the present disclosure are described in examples with reference to the accompanying drawings. However, those skilled in the art should understand that various improvements may be made to the VR device management method and system proposed in the present disclosure without departing from the content of the present disclosure. Therefore, the protection scope of the present disclosure should be determined by the content of the appended claims.

What is claimed is:

1. A high-precision anti-interference Virtual Reality (VR) system, comprising a data selection module, a headset, and a handle matched with the headset, wherein,
   the data selection module is configured to select and invoke an optical tracking module group and an electromagnetic tracking module group according to an optical Field Of View (FOV) range;
   the optical tracking module group comprises an optical display module arranged in the handle and an optical tracking module arranged on the headset, wherein,
   the optical display module is configured to emit a physical signal by adjusting on-off and brightness of the optical display module;
   the optical tracking module is configured to: obtain the physical signal emitted by the optical display module, and convert the physical signal into tracking information of the handle;
   the electromagnetic tracking module group comprises an electromagnetic emission module arranged on the handle and an electromagnetic receiving module arranged on the headset, wherein,
   the electromagnetic emission module is configured to generate an electromagnetic signal through a driving circuit, and transmit the electromagnetic signal; and
   the electromagnetic receiving module is configured to receive the electromagnetic signal to complete electromagnetic tracking;
   wherein the optical tracking module comprises a head-mounted camera and a parameter adjustment module, wherein:
   the head-mounted camera is configured to track the handle and an external environment;
   the parameter adjustment module is configured to: adjust an exposure parameter of the head-mounted camera, align an exposure center point of each head-mounted camera, and preset a tracking rule of the head-mounted camera; and
   the tracking rule comprises: an odd-numbered frame of an image obtained by the head-mounted camera is used to track the external environment and an even-numbered frame of the image obtained by the head-mounted camera is used to track the handle;
   wherein in a case that the optical FOV is within a preset threshold range, optical tracking is automatically selected; and in a case that the optical FOV is outside the preset threshold range, electromagnetic tracking is automatically selected.

2. The high-precision anti-interference VR system according to claim 1, wherein
   both the headset and the handle are provided with an Inertial Measurement Unit (IMU) sensor module configured to obtain tracking information and location prediction information of the headset and the handle, and the IMU sensor module comprises at least a gravity acceleration sensor and a gyroscope; and
   the IMU sensor module in the headset is further configured to assist in adjusting the exposure parameter; the IMU sensor module in the handle is further configured to: select the on-off of the optical display module according to predicted tracking information of the handle, and adjust the brightness of the optical display module.

3. The high-precision anti-interference VR system according to claim 2, wherein the system further comprises a wireless transmission module group, and
   the wireless transmission module group comprises a headset wireless module arranged on the headset and a handle wireless module arranged on the handle, the handle wireless module matches the headset wireless module and is configured to cooperate with the headset wireless module to transmit a wireless signal.

4. The high-precision anti-interference VR system according to claim 3, wherein
   the wireless signal comprises key information of the handle, IMU sensing information of the handle obtained by the IMU sensor module, synchronization information between a time system of the headset and a time system of the handle, and display information of the optical display module.

5. The high-precision anti-interference VR system according to claim 1, wherein
   the electromagnetic receiving module is further configured to perform signal amplification and A/D conversion on the electromagnetic signal, and complete data conversion from an Inter-IC Sound (I2S) to a Serial Peripheral Interface (SPI) or a Universal Serial Bus (USB) through a Field Programmable Gate Array (FPGA) chip to form a tracking digital signal, and transmit the tracking digital signal to a processor.

6. The high-precision anti-interference VR system according to claim 5, wherein
   the processor is configured to read emission calibration information of the electromagnetic emission module, and obtain receiving calibration information of the electromagnetic receiving module to initialize an electromagnetic tracking system, and obtain the tracking digital signal to complete the electromagnetic tracking.

7. The high-precision anti-interference VR system according to claim 1, wherein the system further comprises a time stamp implementation module, and
   the time stamp implementation module is configured to calculate a latency time in a process of tracking the handle to obtain a correct time stamp when a tracking behavior occurs.

8. A high-precision anti-interference VR operation method, comprising:
   obtaining an optical FOV range of the VR system in real time; and
   selecting and invoking a tracking mode according to the optical FOV range, wherein the tracking mode comprises an optical tracking mode and an electromagnetic tracking mode; wherein
   when the optical tracking mode is selected, a physical signal of an optical display module in a handle is obtained, the physical information is converted into a digital signal, and the digital signal is transmitted to a processor to complete optical tracking; and
   when the electromagnetic tracking mode is selected, an electromagnetic signal emitted by the handle is obtained, the electromagnetic signal is digitally processed to form a digital signal, and the digital signal is sent to the processor to complete electromagnetic tracking;

the method further comprising:

tracking, by a head-mounted camera, the handle and an external environment;

adjusting, by a parameter adjustment module, an exposure parameter of the head-mounted camera, aligning an exposure center point of each head-mounted camera, and presetting a tracking rule of the head-mounted camera; wherein the tracking rule comprises: an odd-numbered frame of an image obtained by the head-mounted camera is used to track the external environment and an even-numbered frame of the image obtained by the head-mounted camera is used to track the handle; and the method further comprising: when the optical FOV is within a preset threshold range, automatically selecting the optical tracking; and when the optical FOV is outside the preset threshold range, automatically selecting the electromagnetic tracking.

9. A computer-readable storage medium, wherein a computer program is stored in the computer-readable storage medium, and the computer program implements steps of the method in claim 8 when executed by a processor.

10. An electronic apparatus, comprising:

a memory configured to store a computer program; and a processor configured to execute the computer program to:

obtain an optical FOV range of the VR system in real time; and select and invoke a tracking mode according to the optical FOV range, wherein the tracking mode comprises an optical tracking mode and an electromagnetic tracking mode; wherein when the optical tracking mode is selected, a physical signal of an optical display module in a handle is obtained, the physical information is converted into a digital signal, and the digital signal is transmitted to a processor to complete optical tracking;

when the electromagnetic tracking mode is selected, an electromagnetic signal emitted by the handle is obtained, the electromagnetic signal is digitally processed to form a digital signal, and the digital signal is sent to the processor to complete electromagnetic tracking;

track, by a head-mounted camera, the handle and an external environment;

adjust, by a parameter adjustment module, an exposure parameter of the head-mounted camera, align an exposure center point of each head-mounted camera, and preset a tracking rule of the head-mounted camera; wherein the tracking rule comprises: an odd-numbered frame of an image obtained by the head-mounted camera is used to track the external environment and an even-numbered frame of the image obtained by the head-mounted camera is used to track the handle;

when the optical FOV is within a preset threshold range, automatically select the optical tracking; and when the optical FOV is outside the preset threshold range, automatically select the electromagnetic tracking.

11. The method according to claim 8, wherein both the headset and the handle are provided with an Inertial Measurement Unit (IMU) sensor module, and the IMU sensor module comprises at least a gravity acceleration sensor and a gyroscope, the method further comprises:

obtaining, by the IMU sensor module, tracking information and location prediction information of the headset and the handle; and assisting, by the IMU sensor module in the headset, in adjusting the exposure parameter, selecting, by the IMU sensor module in the handle, an on or off state of the optical display module according to predicted tracking information of the handle, and adjusting the brightness of the optical display module.

12. The method according to claim 11, wherein the system further comprises a wireless transmission module group, and the wireless transmission module group comprises a headset wireless module arranged on the headset and a handle wireless module arranged on the handle, the handle wireless module matches the headset wireless module, the method further comprises:

transmitting, by the handle wireless module, a wireless signal by cooperating with the headset wireless module.

13. The method according to claim 12, wherein the wireless signal comprises key information of the handle, the method further comprises:

obtaining, by the IMU sensor module, IMU sensing information of the handle, synchronization information between a time system of the headset and a time system of the handle, and display information of the optical display module.

14. The method according to claim 8, further comprising:

performing, by the electromagnetic receiving module, signal amplification and A/D conversion on the electromagnetic signal, and completing data conversion from an Inter-IC Sound (I2S) to a Serial Peripheral Interface (SPI) or a Universal Serial Bus (USB) through a Field Programmable Gate Array (FPGA) chip to form a tracking digital signal, and transmitting the tracking digital signal to a processor.

15. The method according to claim 14, further comprising:

reading, by the processor, emission calibration information, and obtaining receiving calibration information to initialize an electromagnetic tracking system, and obtaining the tracking digital signal to complete the electromagnetic tracking.

16. The method according to claim 8, further comprising:

calculating, by the time stamp implementation module, a latency time in a process of tracking the handle to obtain a correct time stamp when a tracking behavior occurs.

* * * * *